United States Patent
Aitcin et al.

(10) Patent No.: US 9,611,535 B2
(45) Date of Patent: Apr. 4, 2017

(54) GROOVE MANUFACTURING METHOD (71) Applicant: BOMBARDIER RECREATIONAL PRODUCTS INC., Valcourt (CA)

(72) Inventors: Xavier-Pierre Aitcin, St-Hyacinthe (CA); Yan Bourgeois, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 382 days.

(21) Appl. No.: 14/471,360

(22) Filed: Aug. 28, 2014

(65) Prior Publication Data

US 2015/0059930 A1    Mar. 5, 2015

Related U.S. Application Data

(60) Provisional application No. 61/872,608, filed on Aug. 30, 2013.

(51) Int. Cl.
| | | |
|---|---|---|
| *C23C 8/80* | (2006.01) |
| *B24B 5/40* | (2006.01) |
| *B23F 21/26* | (2006.01) |
| *C23C 8/02* | (2006.01) |
| *B23F 1/08* | (2006.01) |
| *B24B 19/02* | (2006.01) |
| *C23C 8/22* | (2006.01) |
| *B23D 43/02* | (2006.01) |

(52) U.S. Cl.
CPC ................ *C23C 8/80* (2013.01); *B23F 1/08* (2013.01); *B23F 21/26* (2013.01); *B24B 5/40* (2013.01); *B24B 19/02* (2013.01); *C23C 8/02* (2013.01); *C23C 8/22* (2013.01); *B23D 43/02* (2013.01)

(58) Field of Classification Search
CPC .... C23C 8/20; C23C 8/22; C23C 8/44; C23C 8/46
See application file for complete search history.

*Primary Examiner* — Jessee Roe
(74) *Attorney, Agent, or Firm* — BCF LLP (57) ABSTRACT

A method for forming a profile having at least three consecutive concave surfaces in an internal surface of a metal part includes piercing the metal part to create at least three consecutive concave surfaces. First, second and third concave surfaces respectively have first, second and third radii of curvature. The second concave surface is between the first and third concave surfaces. The second radius of curvature is different from the first and third radii of curvature. The method includes carburizing the metal part, grinding the second concave surface, and linear broaching the first and third concave surfaces with an abrasive-covered broach. A method for forming a groove in a surface of a metal part includes broaching the surface to create a groove having a groove surface, carburizing the metal part, and broaching a portion of the groove surface with an abrasive-covered broach after carburizing the metal part.

20 Claims, 10 Drawing Sheets

GROOVE MANUFACTURING METHOD

CROSS-REFERENCE

The present application claims priority to U.S. Provisional Patent Application No. 61/872,608, filed on Aug. 30, 2013, the entirety of which is incorporated herein by reference.

TECHNOLOGICAL FIELD

The present technology relates to methods for manufacturing grooves in metal parts.

BACKGROUND

Features, such as grooves and the like having different types of shapes and dimensions can be formed in interior or exterior surfaces of metal parts using a broaching process in which a broaching tool is pushed through or across the internal/external surface. For high volume, high precision applications however, the standard broaching process is not very effective in producing uniform and low tolerance across all the parts. In order to obtain a very low tolerance on a high production level, the manufacturing cost and time increases drastically when using the standard broaching process.

There is thus a need for a low tolerance, low cost, high volume manufacturing process for creating metal parts.

SUMMARY

It is an object of the present technology to ameliorate at least some of the inconveniences present in the prior art.

According to one aspect of the present technology, there is provided a method for forming a profile having at least three consecutive concave surfaces in an internal surface of a metal part includes piercing the metal part to create at least three consecutive concave surfaces comprising a first concave surface having a first radius of curvature, a second concave surface having a second radius of curvature and a third concave surface having a third radius of curvature. The second concave surface is between the first and third concave surfaces and the second radius of curvature is different from the first and third radii of curvature. The method includes carburizing the metal part, grinding the second concave surface of the internal profile, and linear broaching the first and third concave surfaces with an abrasive-covered broach.

In some implementations, the force applied to the abrasive covered broach is measured while broaching the first and third concave surfaces, and broaching the first and third concave surfaces is stopped when the force decreases to a predetermined first threshold level.

In some implementations, the abrasive-covered broach is a first abrasive-covered broach having a first grit. The method includes broaching the first and third concave surfaces with a second abrasive-covered broach having a second grit, the second grit being different from the first grit.

In some implementations, the force applied to the second abrasive-covered broach is measured while broaching the first and third concave surfaces, and broaching the first and third concave surfaces is stopped when the force decreases to a predetermined second threshold level.

In some implementations, the first and third concave surfaces are broached with a third abrasive-covered broach having a third grit different from the first grit and the second grit.

In some implementations, the force applied to the third abrasive covered broach is measured while broaching the first and third concave surfaces, and broaching the first and third concave surfaces is stopped when the force decreases to a predetermined first threshold level.

In some implementations, the abrasive is a diamond abrasive.

In some implementations, the first, second and third concave surfaces are simultaneously broached with a second abrasive-covered broach.

In some implementations, the force applied to the second abrasive-covered broach is measured during simultaneously broaching the first, second and third concave surfaces, and simultaneously broaching the first, second and third concave surfaces is stopped when the force decreases to a predetermined threshold level.

In some implementations, piercing the metal part includes piercing the metal part to create an opening therethrough, and linear broaching an inner surface defining the opening to create the at least three consecutive concave interior surfaces.

In some implementations, the first, second and third concave surfaces are simultaneously linearly broached before carburizing the metal part.

In some implementations, the first radius of curvature is equal to the third radius of curvature.

In some implementations, the profile has a repeating pattern of sets of third, second, and first concave surfaces, each first concave surface being connected to the third concave surface of an adjacent set.

In some implementations, at least some of the sets include a fourth surface, each fourth surface being disposed between the first concave surface of the corresponding set and the third concave surface of an adjacent set via a fourth surface. The profile has a repeating pattern of third, second, first and fourth concave surfaces.

According to another aspect of the present technology, there is provided a method for forming a groove in a surface of a metal part includes broaching the surface of the metal part to create a groove having a groove surface, carburizing the metal part, and broaching a portion of the groove surface with an abrasive-covered broach after carburizing the metal part.

In some implementations, after carburizing the metal part, grinding a portion of the surface of the metal part outside the groove, the surface of the metal part outside the groove being the outside surface, the portion of the outside surface having a substantially larger area than the portion of the groove surface.

In some implementations, during broaching the portion of the groove surface with the abrasive-covered broach, a portion of a surface outside the groove with the abrasive-covered broach is simultaneously broached.

In some implementations, during broaching the portion of the groove surface with the abrasive-covered broach, the force required for broaching is measured, and broaching is stopped when the force decreases to a predetermined level.

In some implementations, the abrasive-covered broach is a first abrasive-covered broach having a first grit. A second portion of the groove surface and a portion of a surface outside the groove are simultaneously broached with a second abrasive-covered broach. The second grit is different from the first grit.

In some implementations, the surface of the metal part is an internal surface.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The groove manufacturing method is described below with respect to grooves in an interior surface of a sliding shaft made of steel it but is contemplated that aspects of the technology could be applied to other features and components made of other metals such as iron, copper and the like and having other shapes and/or dimensions.

With reference to FIGS. 1A to 1D, a sliding shaft 10 has a tubular body with a central axis 11. In the discussion below, terms such as "longitudinal", "radial", and "circumferential" are used with respect to the central axis 11. The sliding shaft 10 has an outer cylindrical surface 12, an inner cylindrical surface 14 and an opening 40. The outer surface 12 has several features 18, including ridges and grooves, which are used to mate and align the sliding shaft 10 with other components of the continuously variable transmission. The inner cylindrical surface 14 defines an inner diameter 20 of the sliding shaft 10. The sliding shaft has a top shoulder 16 and a bottom shoulder 17 also used to mate and align the sliding shaft 10 with other components of the continuously variable transmission. The inner surface (not indicated) of the shoulder regions 16, 17 has a larger diameter than the inner diameter 20 of the inner cylindrical surface 12 between the shoulder regions 16, 17.

Six grooves 22 extend longitudinally (parallel to the central axis 11) along the inner cylindrical surface 14. The six grooves 22 are identical and distributed uniformly in the circumferential direction, as such only one of the grooves 22 will be described below. It is however contemplated that the grooves 22 could not be distributed uniformly and that one or more of the grooves 22 could be different from the other grooves 22. It is also contemplated that there could be more or less than six grooves 22.

The groove 22 extends from the top shoulder 16 to the bottom shoulder 17. The groove 22 has two longitudinal edges 30 connected to the inner cylindrical surface 14 and a groove surface 24 extending between the groove edges 30. The portion of the groove surface 24 adjacent to each longitudinal edge 30 is an outer groove surface 32. The outer groove surfaces 32 of each groove 22 are connected to an inner groove surface 34. The groove surfaces 32, 34 are concave surfaces. Both outer groove surfaces 32 have the same radius of curvature and a common center of curvature. Both outer groove surfaces 34 have the same radius of curvature. The radius of curvature of the outer groove surfaces 32 is smaller than the radius of curvature of the inner groove surfaces 34. The radius of curvature of the each surface 32, 34 is substantially smaller than the radius of the inner cylindrical surface 14.

In the illustrated implementation of the sliding shaft 10, the outer groove surface 32 is designed to contact ball bearings (not shown) received in the grooves 22. The radius of curvature of the outer groove surfaces 32 therefore corresponds to the radius of ball bearings. The inner groove surfaces 34 extend radially outwardly of the outer groove surfaces 32 and do not contact the ball bearings. The space between the ball bearings and the inner groove surfaces 34 is used for lubrication. The inner surfaces 34 thus form a lubricant groove 34. As such, the inner groove surfaces 34 do not have to be fabricated to have as low a tolerance as the outer groove surfaces 32 which are designed to receive the ball bearings.

Furthermore, during the broaching process for the precise dimensioning of the sliding shaft 10, which will be discussed below in further detail, the broaching tool only contacts the outer groove surfaces 32. A decreased contact area with the broaching tool contributes to a decrease in the force applied by the sliding shaft 10 to the broaching tool, leading to a decrease in wear and tear of the tool, manufacturing cost as well as time.

While the groove 22 of the sliding shaft 10 illustrated herein has a groove surface 24 includes two outer groove surfaces 32 having an outer radius of curvature and two inner groove surfaces 34 having an inner radius of curvature, it is contemplated that the groove surface 24 could be a continuous surface having a single radius of curvature between the groove edges 30, i.e. a continuous cylindrical groove surface 24.

Figure 1A:
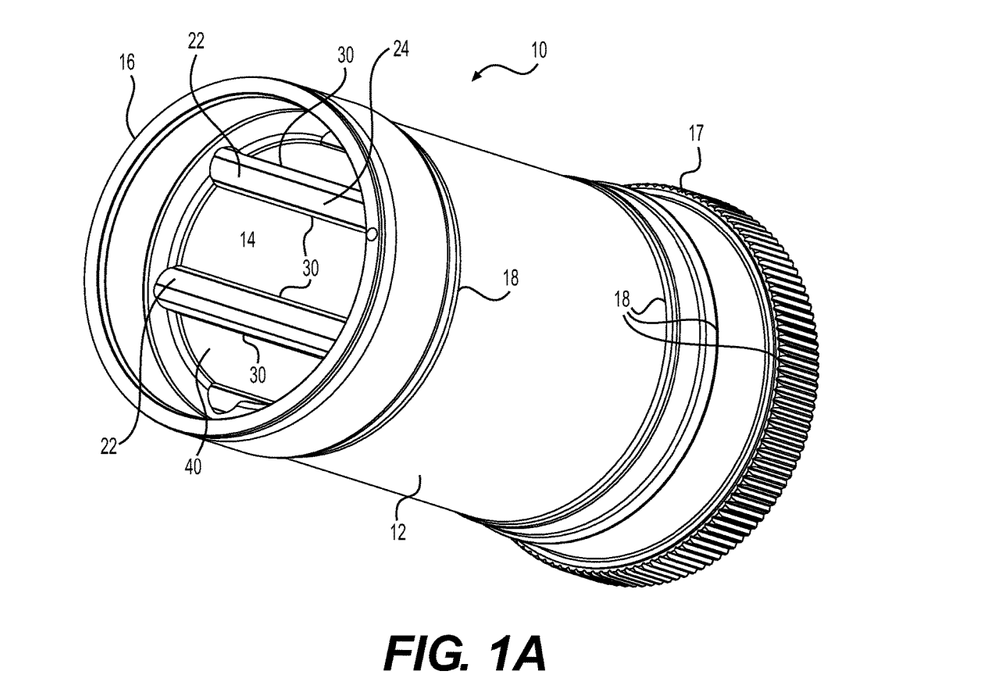
FIG. 1A is a perspective view taken from a top, front of a sliding shaft for a continuously variable transmission manufactured according to an implementation of a method.
Figure 1B:
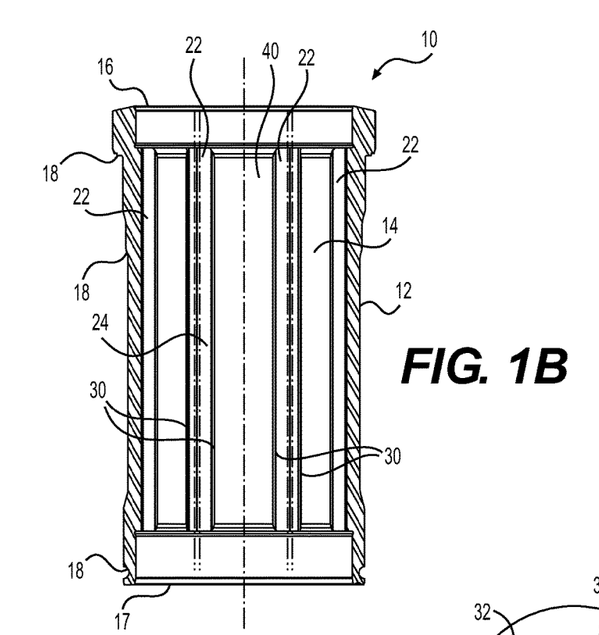
FIG. 1B is a cross-sectional view of the sliding shaft of FIG. 1A taken along the line 1B-1B of FIG. 1C.
Figure 1C:
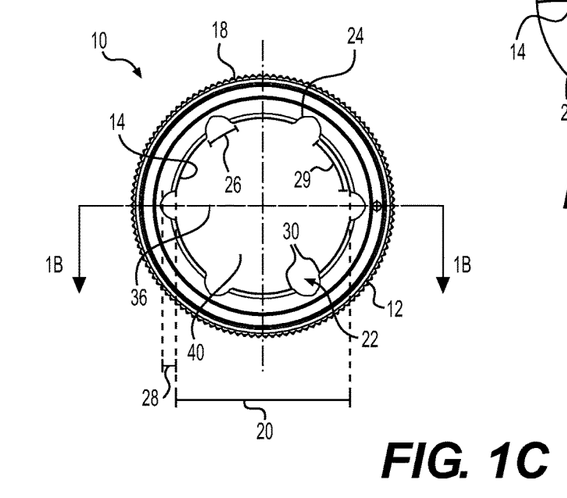
FIG. 1C is a top plan view of the sliding shaft of FIG. 1A.
Figure 1D:
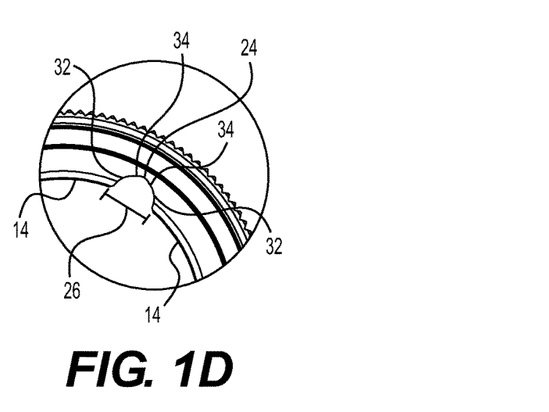
FIG. 1D is a close-up top plan view of a portion of the sliding shaft of FIG. 1A.

When viewed from the top or bottom, as shown in FIGS. 1C and 1D, a radial plane 36 extends between and equally spaced from the groove edges 30. The circumferential direction spacing between the longitudinal groove edges 30 defines a groove width 26. The groove 22 has a radial direction groove depth 28 defined as the distance, in the plane 36, between the inner cylindrical surface 14 and the point where the two outer groove surfaces 34 would hypothetically meet. The inner cylindrical surface 14 has a circumferential length 29 between the near edges 30 of adjacent grooves 22.

The sliding shaft 10 of the illustrated implementation is made of steel but it is contemplated that it could be made of other metals, such as iron copper, brass.

A method 100 for fabricating the sliding shaft 10 will now be described below with reference to the FIGS. 2 to 9.

The method 100 begins at step 110 with a metal cylinder 10' (FIG. 2) having an opening 40 with an inner diameter 20' smaller than the inner diameter 20 of the sliding shaft 10. The hollow cylinder 10' has an inner cylindrical surface 14' and an outer cylindrical surface 12'.

Figure 2:
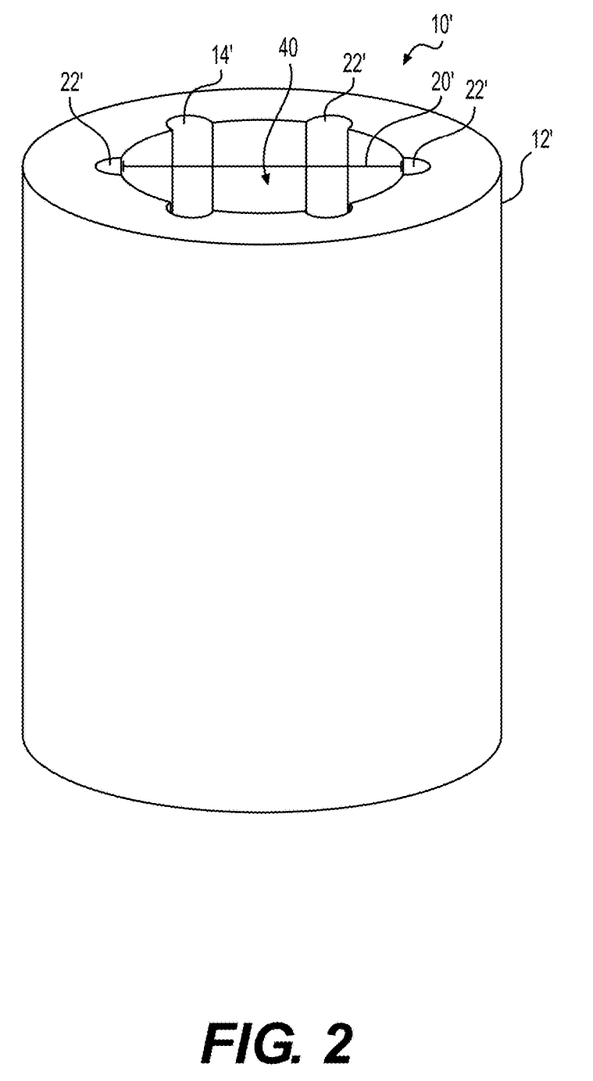
FIG. 2 is a perspective view taken from a top, front of a hollow metal cylinder before being formed into the sliding shaft of FIG. 1A.

At step 120, the outer surface 12' of the cylinder 10' is machined to form the features 18 thereby forming the outer surface 12 of the sliding shaft 10. It is contemplated that the outer surface 12 could be machined after the inner surface 14 has been fabricated. It should also be understood that the features on the outer surface 12 are only exemplary and not to be considered to be limiting.

In step 130, the inner cylindrical surface 14' is broached to create the inner cylindrical surface 14 having grooves 22 with inner and outer groove surfaces 32, 34. The entire groove surface 24 including the outer groove surfaces 32 and the inner groove surfaces 34 of each groove 22 is broached during this step 130.

Figure 7:
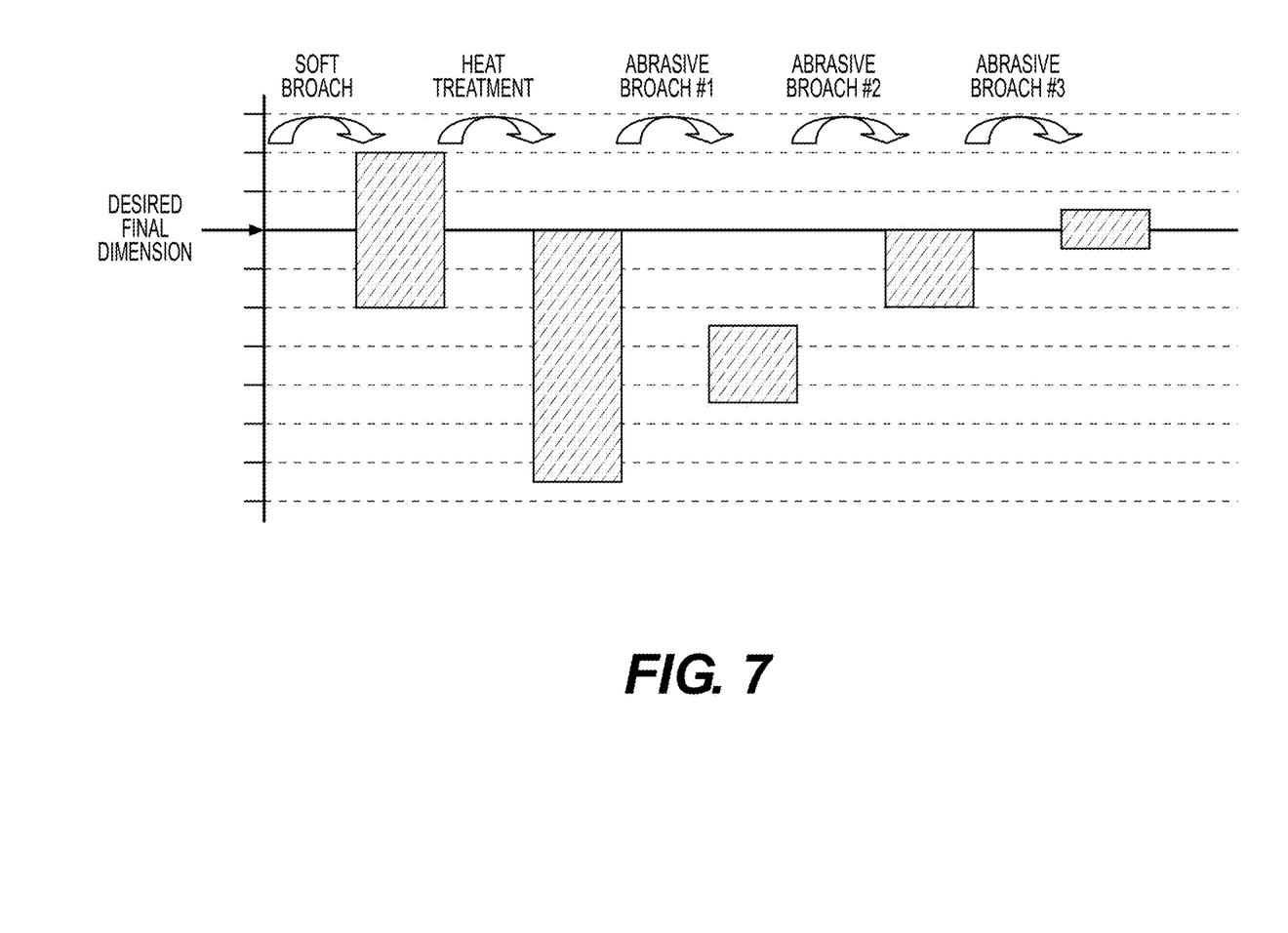
FIG. 7 is an illustration of the tolerance achieved after different steps of the method for forming the sliding shaft of FIG. 1A.

During this soft broaching step 130, the broaching tool contacts and removes material from the inner cylindrical surface 14 as well as the groove surfaces 32, 34. With reference to FIG. 7, in the illustrated implementation, the soft broaching step 130 is performed so as to produce sliding shaft dimensions 20, 26, 28, 29 having a mean value that is equal to the respective final desired dimensions. The sliding shaft 10 has a starting tolerance, defined by the variation in the sliding shaft dimensions 20, 26, 28, 29 with respect to their respective mean values, that is greater than the desired tolerance. Simultaneous broaching of the inner cylindrical surface 14 and the groove surfaces 32, 34 ensures that, at the end of step 130, the dimensions of the groove 22, including the groove width 26 and groove depth 28, and the inner diameter 20 are within the same relative tolerance of the desired final dimensions thereof.

At step 140, the metal part 10 is carburized, i.e. subjected to a heat treatment process in a carbon rich atmosphere in order to harden the surface. In general, the hardness of the surface and the depth of carbon penetration increase with time, temperature and carbon concentration. The precise parameters for the carbon concentration and temperature used in the carburization process are based on the configuration of the chamber in which heat treatment occurs and the shape and dimensions of the component being carburized. The heat treatment process and resultant hardening of the sliding shaft 10 contributes to its strength and durability.

The heat treatment process of step 140 causes expansion and distortion of the sliding shaft 10. As the dimensions of the inner cylindrical surface 14 and the grooves surfaces 32, 34 are within the same tolerance of the desired final dimensions after the soft broaching step 130, the distortion due to the carburization process of step 140 causes the same change in tolerance of these dimensions. Thus, the relative variation of the inner diameter 20 is generally the same as the variation in groove depth 28 and the groove width 26. With reference to FIG. 7, in the illustrated implementation, the mean dimensions of the groove 22 and the inner diameter 20 of the cylinder 10 after carburization (step 140) are offset from their respective final desired values. In addition, the carburization process of step 140 also increases the variation of the sliding shaft dimensions 20, 26, 28, 29 from their respective mean values in comparison to the variation from the mean values after the soft broaching step 130.

Figure 4:
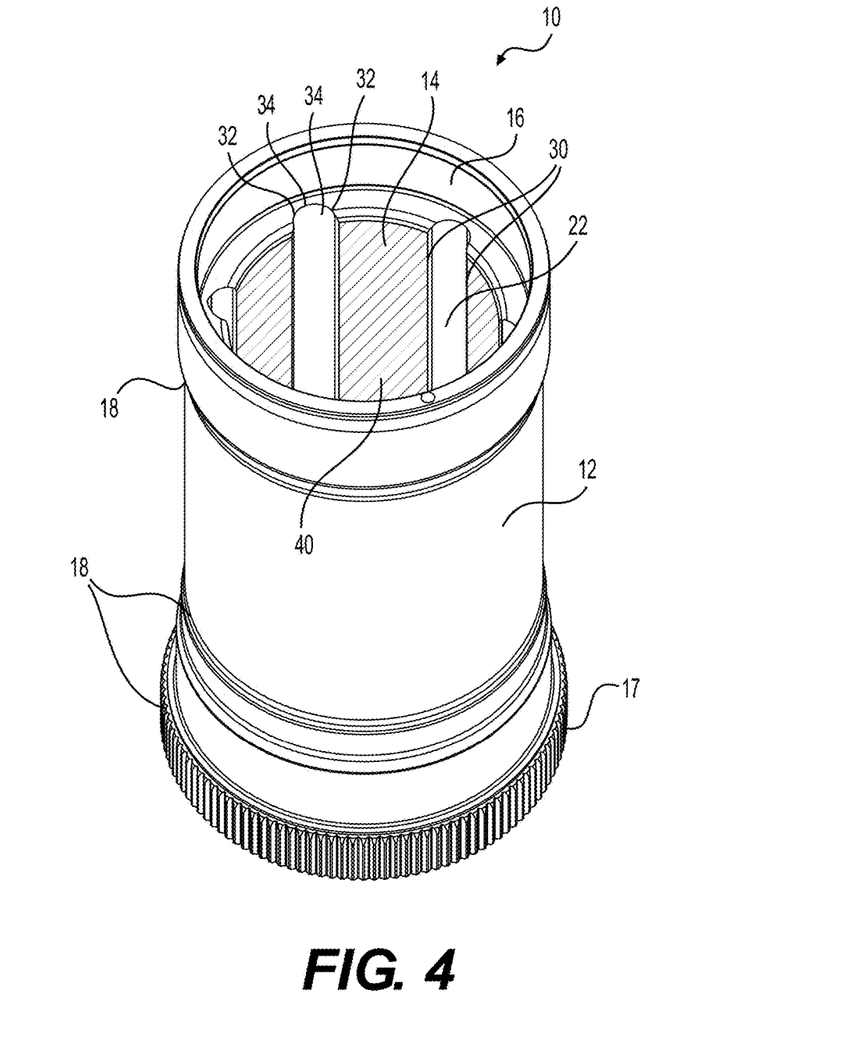
FIG. 4 is a perspective view taken from a top, front of the sliding shaft of FIG. 1A, with hatching to indicate the portion of the surface thereof that is subjected to a grinding step in accordance with a method for forming the sliding shaft of FIG. 1A.
Figure 5:
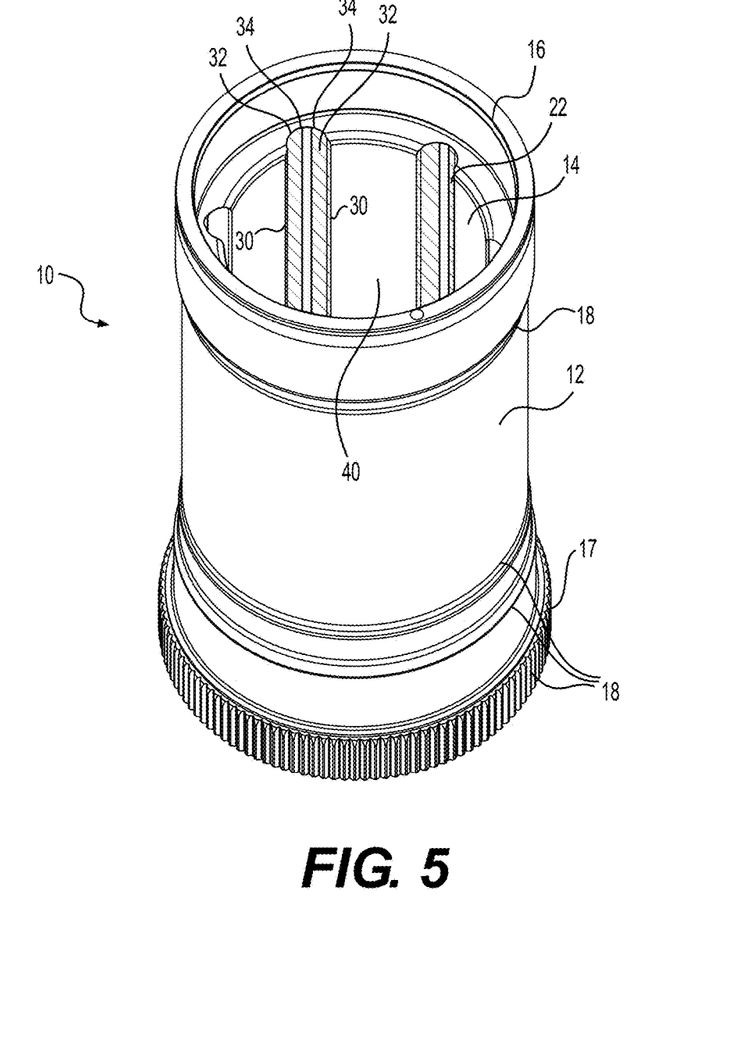
FIG. 5 is a perspective view taken from a top, front of the sliding shaft of FIG. 1A with hatching to indicate the portion of the surface thereof subjected to an abrasive broaching in accordance with the method for forming the sliding shaft of FIG. 1A.
Figure 6:
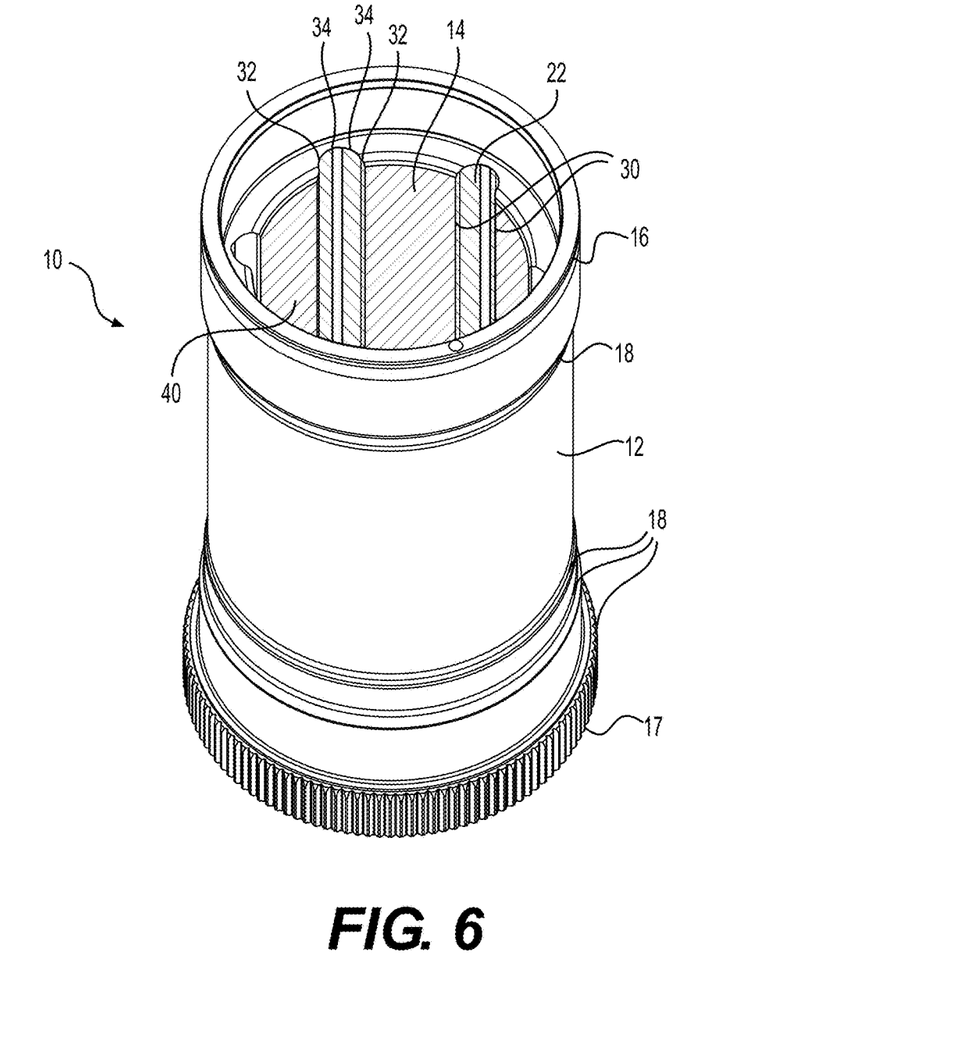
FIG. 6 is a perspective view taken from a top, front of the sliding shaft of FIG. 1A with hatching to indicate the portion of the surface thereof that is subjected to another abrasive broaching in accordance with the method for forming the sliding shaft of FIG. 1A.

With reference to FIG. 4, in the next step 150, the inner cylindrical surface 14 of the hardened sliding shaft 10 is rectified by subjecting it to a grinding process in order to bring the inner diameter 20 within the final desired tolerance. A rotating grinding wheel (not shown) or a rotary broach tool (not shown) coated with an abrasive material such as diamond, aluminum oxide, cubic boron nitride and the like is passed through the opening 40 so as to contact and thereby grind the inner cylindrical surface 14. It is contemplated that during this step 150, the groove surfaces 32, 34 could also be subjected to grinding simultaneously along with the inner cylindrical surface 14.

In steps 160 to 210, the grooves 22 are broached in order to bring the spacing 29 between adjacent grooves 22, the groove depth 28 and groove width 26 for each groove 22 to within the desired tolerance. The grooves 22 are broached using a broach 300 such as that shown in FIG. 3 covered with an abrasive coating. In the implementation illustrated and described herein, the abrasive coating is diamond but it is contemplated that other abrasives such as aluminum oxide could be used instead of diamond.

A first abrasive broaching is performed in steps 160 and 170 using a broach, such as the broach 300 described below.

Figure 3:
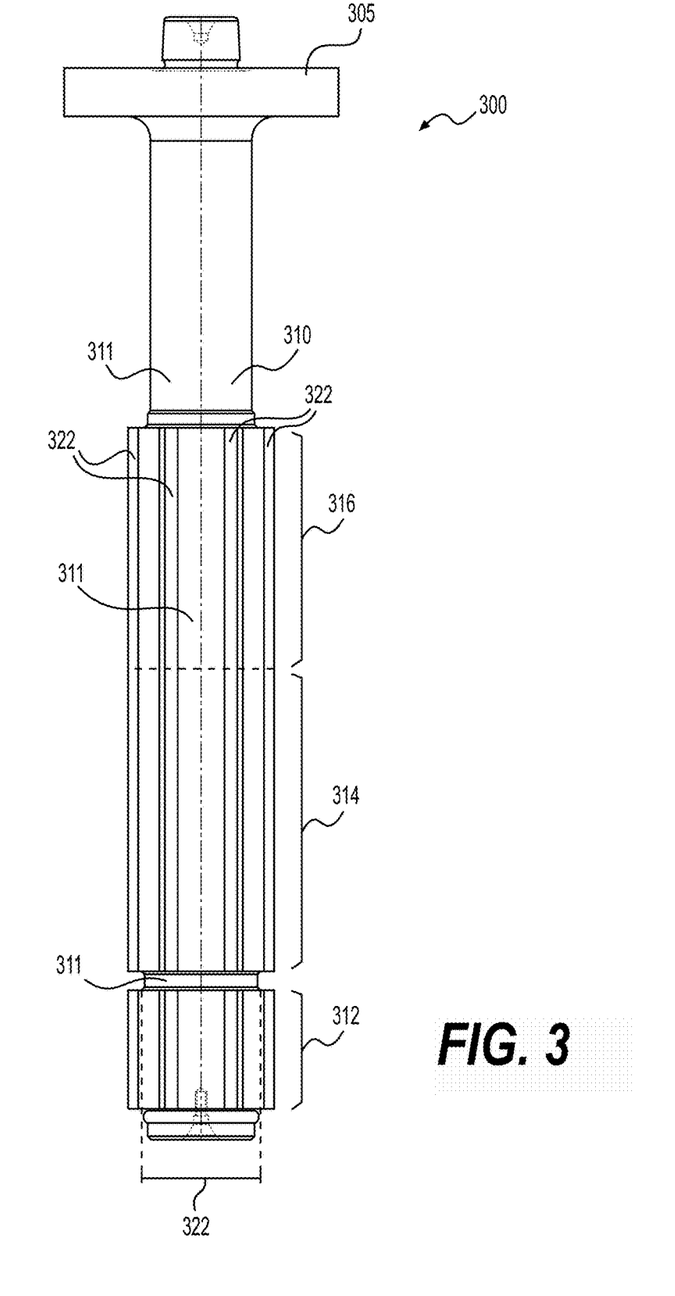
FIG. 3 is a front elevation view of a broaching tool used to form the sliding shaft of FIG. 1A.

With reference to FIG. 3, the broaching tool 300, or broach 300, includes a mounting flange 305 by which the broach 300 is mounted on a broaching machine (not shown). A shaft 310 extending from one side of the mounting flange 302 is pushed through the opening 40 of the sliding shaft 10. The shaft 310 has an outer cylindrical surface 311 with an outer diameter 320. The shaft 310 has six longitudinal projections 322 corresponding to the six longitudinal grooves 22 of the sliding shaft 10. The shaft 310 has a guide or pilot portion 312, at the end opposite the mounting flange 305, a finishing portion 316 closest to the mounting flange 305 and an intermediate portion 314 between the guide and finishing portions 312, 316. In the guide portion 312 and the intermediate portion 314, the circumferential direction width and radial direction height of the projections 322 increase toward the mounting flange 305. The dimensions (circumferential direction width and radial direction height) of the projections 322 in the intermediate portion 314 are greater than the corresponding dimensions of the projections 322 in the guide portion 312. The guide portion 312 helps to start broaching of the contacting surface. The projections 322 have larger dimensions in the finishing portion 316 than in the intermediate portion 314. The dimensions of the projections 322 are uniform or constant in the finishing portion 316.

The broach 300 used in steps 160, 170 is coated with diamond abrasive so as to have a coarse grit, for example, grit code K. The broach 300 used for steps 160, 170 has an outer shaft diameter 320 that is smaller than the inner diameter 20 of the inner cylindrical surface 14 so as to avoid contact therewith. The projections 322 of the broach 300 do not contact the inner groove surfaces 34 which are not broached during this step. It is contemplated that the inner groove surfaces 34 could also be broached during the abrasive broaching step 160, 170. The force F applied to the broach 300, the duration of the step 160 and the grit are adapted to remove a greater amount of material than in subsequent steps 180 and 200. For the first pass through the opening 40 of the sliding shaft, the broach 300 is operated in an oscillating manner where the broach is retreated between consecutive advancing steps. The first pass through the sliding shaft 10 is performed by controlling the force used for each advancing step. Subsequent passes through the opening 40 of the sliding shaft 10 are performed in a non-oscillatory manner where the broach 300 is pushed through the opening 40 from one end 16, 17 end to the other end 16, 17 without reversing direction. The force F applied to the broach 300 is measured continuously as the broach 300 is pushed in this non-oscillatory manner through the shaft 10. It is also contemplated that the force F applied to the broach 300 could be measured once at or near the end of each non-oscillatory pass through the shaft 10. It is further contemplated that the force F applied to the broach 300 could be measured once after a fixed number of non-oscillatory passes through the sliding shaft 10. The abrasive broaching step 160 is continued until the measure force F decreases below a first predetermined threshold level $F_{t1}$.

Figure 9:
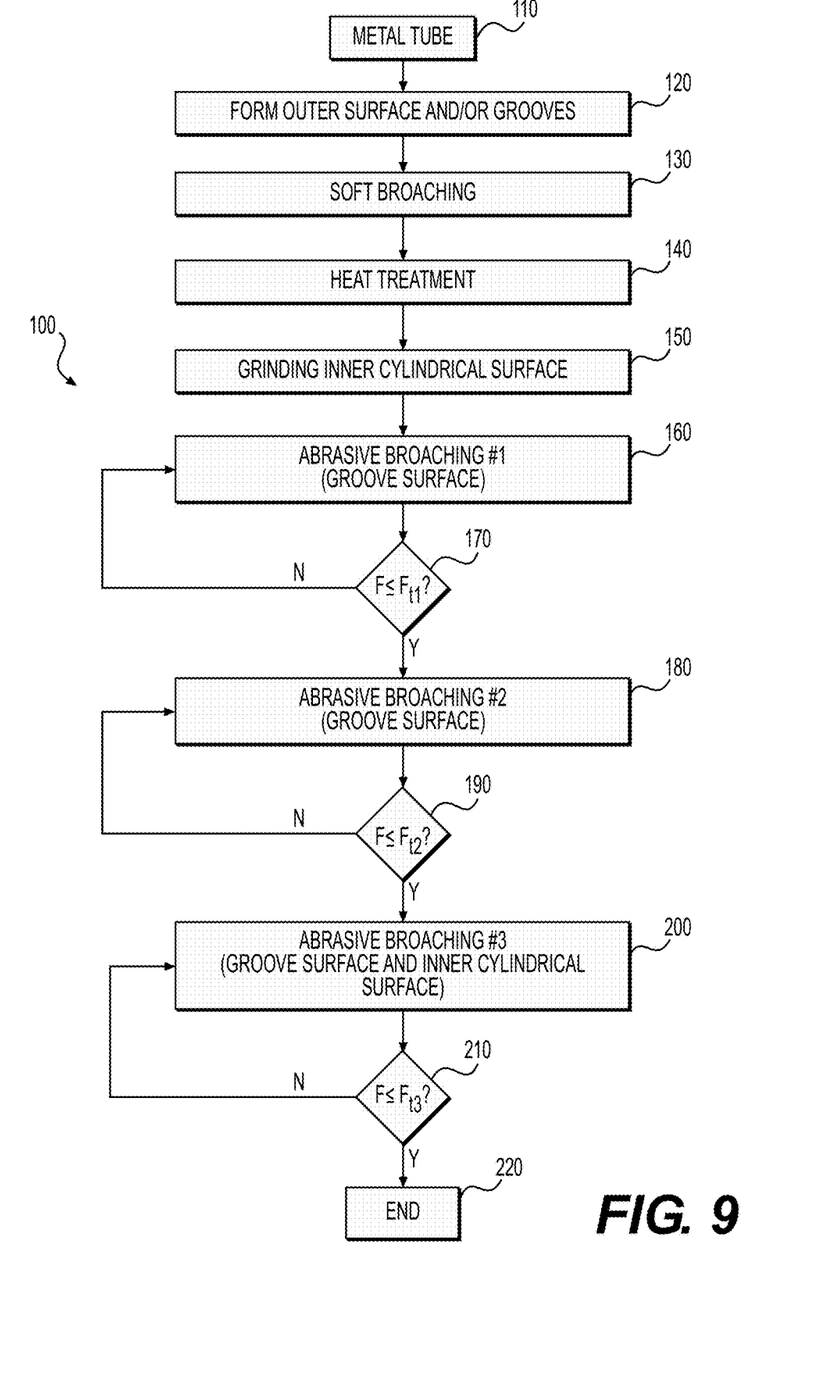
FIG. 9 is a logic diagram illustrating the steps of the method for forming the sliding shaft of FIG. 1A.

At step 170, the force F is compared to the threshold level $F_{t1}$. If the force F is greater than the threshold level $F_{t1}$, the method returns to step 160 to continue broaching by non-oscillatory passes of the first abrasive broach 300 through the sliding shaft 10. If the force F is equal to or less than the threshold level $F_{t1}$, the method proceeds to step 180 to the second abrasive broaching stage. The first abrasive broach 300 configured to perform steps 160, 170 is removed and replaced with a second abrasive broach 300 configured to perform steps 180, 190.

It is contemplated that the first abrasive broach 300 could be operated 10 in an oscillatory manner for more than one pass through the sliding shaft. It is also contemplated that the force F applied to the broach 300 could be measured during the oscillatory pass(es) through the sliding shaft 10.

With reference to FIG. 7, in the illustrated implementation, the mean dimensions 22, 26, 29 of the groove 22 after the first abrasive broaching stage (step 160, 170) are closer to the respective final desired values than after the grinding step 130. The variation from the mean dimensions is also reduced compared to that after the grinding step 130.

In steps 180 and 190, a second abrasive broaching is performed on the sliding shaft 10. The steps 180 and 190 are respectively similar to the steps 160 and 170. The second abrasive broach 300 used for this second abrasive broaching stage is similar to the first abrasive broach 300 used for the first abrasive broaching stage. However, the second abrasive broach 300 is covered with the diamond abrasive so as to have a finer grit than the first abrasive broach 300. For example, the second abrasive broach 300 could be coated so as to have a grit code 0. The second abrasive broach 300 used for steps 180, 190 has an outer shaft diameter 320 that is smaller than the inner diameter 20 of the inner cylindrical surface 14 so as to avoid contact therewith. The projections 322 of the broach 300 do not contact the inner groove surfaces 34 which are not broached during this step. It is contemplated that the inner groove surfaces 34 could also be broached during the second abrasive broaching step 180, 190. Similar to the first abrasive broaching stage, the first pass of the second abrasive broach 300 through the sliding shaft 10 is performed in an oscillatory manner and by controlling the force applied for each forward step. In the illustrated implementation, the second abrasive broach 300 is pushed slower through the shaft 10 than the first abrasive broach 300 in the step 160. Thus the first pass of the second abrasive broach 300 in step 180 takes longer than the first pass of the first abrasive broach 300 in step 160. Subsequent passes, following the first oscillatory pass, of the second abrasive broach 300 through the sliding shaft 10 are performed in a non-oscillatory manner while simultaneously and continuously monitoring the force F applied to the broach 300. In the step 180, the force F applied to the second abrasive broach 300 to push it through the sliding shaft 10 is smaller than that applied to the first abrasive broach 300 in step 160. It is also contemplated that the force F applied to the second abrasive broach 300 could be measured once at or near the end of each non-oscillatory pass through the shaft 10. It is further contemplated that the force F applied to the second abrasive broach 300 could be measured once at the end of a fixed number of non-oscillatory passes through the sliding shaft 10. The second abrasive broaching step 180 is continued until the force F decreases below a second predetermined second threshold level $F_{t2}$. The second threshold level $F_{t2}$ is smaller than the first threshold level $F_{t1}$.

At step 190, the force F is compared to the second threshold level $F_{t2}$. If the force F is greater than the second threshold level $F_{t2}$, the method 100 returns to step 180 to continue broaching. If the force F is equal to or less than the second threshold level $F_{t2}$, the method proceeds to step 200 to the third abrasive broaching stage. The broach 300 configured to perform steps 180, 190 is removed and replaced with a broach 300 configured to perform steps 200, 210.

It is contemplated that the second abrasive broach 300 could be operated to pass through the sliding shaft 10 in an oscillatory manner for more than one pass. It is also contemplated that the force F applied to the second abrasive broach 300 could also be measured during the oscillatory pass(es) through the sliding shaft 10.

With reference to FIG. 7, in the illustrated implementation, the mean dimensions 22, 26, 29 of the groove 22 after the second abrasive broaching (step 180, 190) are closer to the respective final desired values than after the first abrasive (step 160, 170). The variation in the sliding shaft dimensions 26, 28, 29 with respect to the mean dimensions is also reduced after the second abrasive broaching (step 180, 190) compared to that after the grinding step 130 (step 160, 170).

In the third abrasive broaching stage performed in steps 200 and 210, the inner cylindrical surface 14 is broached simultaneously (FIG. 6) with the outer groove surfaces 32. The step 200, 210 are performed using a third abrasive broach 300 covered with a diamond abrasive coating having a grit code that is finer than the second abrasive broach 300 used in steps 180 and 190. For example, an abrasive coating of grit level R could be used. The broach 300 used for steps 200, 210 has an outer shaft diameter 320 that corresponds to the inner diameter 20 of the inner cylindrical surface 14. The projections 322 of the third abrasive broach 300 do not contact the inner groove surfaces 34 which are not broached during this step. It is however contemplated that the inner groove surfaces 34 could also be broached during the third abrasive broaching (steps 200, 210). Similar to the second abrasive broaching stage, the first pass of the third abrasive broach 300 through the sliding shaft 10 is performed in an oscillatory manner and by controlling the force applied at each forward step. In the illustrated implementation, during the first pass of step 200, the third abrasive broach 300 is pushed slower through the sliding shaft 10 than in the second abrasive broach 300 in the step 180. Thus the first pass of the third abrasive broach 300 in step 200 takes longer than the first pass of the second abrasive broach 300 in step 180.

Subsequent passes, following the first oscillatory pass, of the third abrasive broach 300 through the sliding shaft 10 are performed in a non-oscillatory manner while simultaneously and continuously monitoring the force F applied to the third abrasive broach 300. It is also contemplated that the force F applied to the third abrasive broach 300 could be measured once at or near the end of each non-oscillatory pass through the shaft 10. It is further contemplated that the force F applied to the third abrasive broach 300 could be measured at the end of a fixed number of non-oscillatory passes through the sliding shaft 10.

In the step 200, the force F applied to the third abrasive broach 300 to push it through the sliding shaft 10 during a non-oscillatory pass is greater than that applied to the second abrasive broach 300 in step 180. In the step 200, the force F applied to the third abrasive broach 300 to push it through the sliding shaft 10 during a non-oscillatory pass is also greater than that applied to the first abrasive broach 300 in step 160 as the third abrasive broach 300 contacts a much larger surface area in step 200 compared to the first abrasive broach in step 160. The force F applied to the broach 300 to push the third abrasive broach 300 through the sliding shaft 10 in steps 200, 210 however is substantially less than in the soft broaching step 130 as the amount of material to be removed is substantially less in step 200 than in step 130. The third abrasive broaching is continued until the force F applied to the third abrasive broach 300 decreases below a third predetermined threshold level $F_{t3}$. The third threshold level $F_{t3}$ is greater than the first threshold level $F_{t1}$.

At step 210, the force F is compared to the threshold level $F_{t3}$. If the force F is greater than the threshold level $F_{t3}$, the method returns to step 200 to continue broaching. If the force F is equal to or less than the threshold level $F_{t3}$, the third abrasive broaching is stopped and the method 100 ends at step 220.

It is contemplated that the third abrasive broach 300 could be operated to pass through the sliding shaft 10 in an oscillatory manner for more than one pass. It is also contemplated that the force F applied to the third abrasive broach 300 could be measured during or at the end of each oscillatory pass(es) through the sliding shaft 10.

With reference to FIG. 7, in the illustrated implementation, the mean dimensions 22, 26, 29 of the groove 22 after the third abrasive broaching (step 200, 210) is equal to the respective final desired values than after the second abrasive (step 180, 190). The variation from the mean dimensions is also within the desired tolerance.

It is contemplated that only the outer groove surfaces 32 are broached during the third abrasive broaching stage, for example, if the inner diameter 20 is brought to within the desired tolerance in the grinding step 150. It is contemplated that abrasive broaching can be performed in more or less than three stages described above. For example, the second abrasive broaching stage (steps 180, 190) could be omitted. As another example, a fourth abrasive broaching stage in which the outer groove surfaces 32 are broached could be added before the third abrasive broaching. It is also contemplated that the entire groove surface 24, including the inner and outer groove surfaces 32, 34 could be broached during any one or more of the abrasive broaching stages. It is contemplated that the grooves 22 could be prepared to the desired tolerance level in a single abrasive broaching stage, the duration of which would however be greater than the duration of the three stage process described above.

It is contemplated that the three abrasive broaching stages described above could be performed using a single broach with three different portions along its length corresponding to the three different stages. The process of abrasive broaching would then not need to be stopped to change the broaches being used. The three-stage broach however would be much longer than the broach 300 described above and would require an appropriately sized machine for its operation.

It is contemplated that the abrasive broaching steps 160 to 210 described above could be performed using abrasive coatings corresponding to other grits than as described herein, for durations, and using forces F other than as described herein.

It is also contemplated that, instead of continually monitoring the force F applied to the broach 300 during each abrasive broaching step 160, 180, 200, the force F applied to the broach 300 could be measured and compared to the corresponding threshold level $F_{t1}$, $F_{t2}$, $F_{t3}$ once at the end of each pass, or after a fixed number of passes through the sliding shaft 10.

Figure 8:
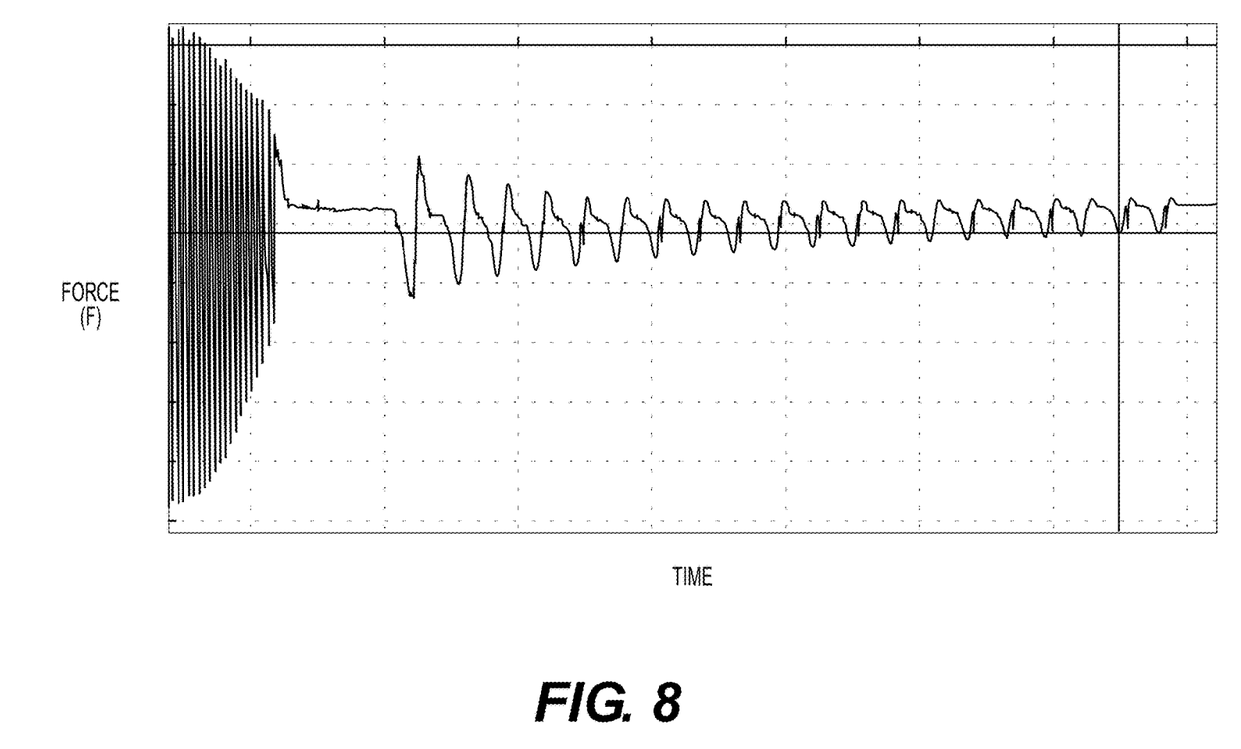
FIG. 8 is a graphical illustration of the force applied to a broach tool as a function of time during the abrasive broaching step illustrated in FIG. 5.

With reference to FIG. 8, the overall magnitude of the force F applied to the abrasive broach 300 decreases as a function of time as the abrasive broach 300 is being pushed through the opening 40 of the sliding shaft 10. This is due to the fact that the resistance offered by the surface being broached 300 decreases with the amount of material removed therefrom. The force F required to push the broach 300 through the sliding shaft 10 is fairly predictable for a given abrasive broaching stage in the formation of different sliding shafts 10 and a given broaching rate. The variation of force F can thus be used as an indirect measure of the dimensions of the grooves 22 and inner cylindrical surface 14 formed at that stage and the achieved tolerance of their respective dimensions.

When manufacturing a large number of sliding shafts 10, a greater uniformity of dimensions, i.e. a smaller tolerance, is obtained by terminating each abrasive broaching step 160, 180, 200 only when the force F required to pass the broach 300 through the sliding shaft 10 reaches a predetermined threshold level, $F_{t1}$, $F_{t2}$, $F_{t3}$ as mentioned above. Using the measured applied force F as a determination factor for continuing or terminating an abrasive broaching step 160, 180, 200 ensures a smaller variation of tolerances among a large number of sliding shafts 10 than if the abrasive broaching step 160, 180, 200 was performed using time, or the number of passes through the sliding shaft 10, as a fixed parameter in the manufacture of different sliding shafts 10.

It should be understood that the above description with reference to the sliding shaft 10 having the particular groove configuration (number, shape, size, distribution, and the like) is exemplary only. The method 100 described above can also be used to prepare grooves different than the ones shown herein.

It is contemplated that the grooves 22 could have one or more convex surfaces in addition to concave surfaces such as the surfaces 32, 34 shown herein. It is further contemplated that aspects of the method 100 described above could be used to prepare features on external surfaces in addition to internal surfaces, such as the inner cylindrical surface 14 shown herein. In order to form and prepare features on an external surface, a broaching tool would be pushed across the surface instead of being pushed through the opening 40 as shown herein.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for forming a profile having at least three consecutive concave surfaces in an internal surface of a metal part:
   piercing the metal part to create the at least three consecutive concave surfaces comprising a first concave surface having a first radius of curvature, a second concave surface having a second radius of curvature and a third concave surface having a third radius of curvature, the second concave surface being between the first and third concave surfaces and the second radius of curvature being different from the first and third radii of curvature;
   carburizing the metal part;
   grinding the second concave surface of the internal surface; and
   linear broaching the first and third concave surfaces with an abrasive-covered broach.

2. The method of claim 1, further comprising:
   measuring a force applied to the abrasive-covered broach while linear broaching the first and third concave surfaces; and
   stopping linear broaching the first and third concave surfaces when the force decreases to a predetermined first threshold level.

3. The method of claim 1, wherein the abrasive-covered broach is a first abrasive-covered broach having a first grit, and further comprising:
   broaching the first and third concave surfaces with a second abrasive-covered broach having a second grit, the second grit being different from the first grit.

4. The method of claim 3, further comprising:
   measuring a force applied to the second abrasive-covered broach while broaching the first and third concave surfaces; and
   stopping broaching the first and third concave surfaces when the force decreases to a predetermined second threshold level.

5. The method of claim 3, further comprising:
   broaching the first and third concave surfaces with a third abrasive-covered broach having a third grit different from the first grit and the second grit.

6. The method of claim 5, further comprising:
   measuring a force applied to the third abrasive covered broach while broaching the first and third concave surfaces; and
   stopping broaching the first and third concave surfaces when the force decreases to a predetermined first threshold level.

7. The method of claim 1, further comprising:
   simultaneously broaching the first, second and third concave surfaces with a second abrasive-covered broach.

8. The method of claim 1, wherein the abrasive is a diamond abrasive.

9. The method of claim 7, further comprising:
   measuring a force applied to the second abrasive-covered broach during simultaneously broaching the first, second and third concave surfaces; and
   stopping simultaneously broaching the first, second and third concave surfaces when the force decreases to a predetermined threshold level.

10. The method of claim 1, wherein piercing the metal part comprises:
    piercing the metal part to create an opening therethrough; and
    linear broaching an inner surface defining the opening to create the at least three consecutive concave interior surfaces.

11. The method of claim 1, further comprising:
    simultaneously linearly broaching the first, second and third concave surfaces before carburizing the metal part.

12. The method of claim 1, wherein the first radius of curvature is equal to the third radius of curvature.

13. The method of claim 1, wherein the profile has a repeating pattern of sets of third, second, and first concave surfaces, each first concave surface being connected to the third concave surface of an adjacent set.

14. The method of claim 13, wherein at least some of the sets comprise a fourth surface, each fourth surface being disposed between the first concave surface of the corresponding set and the third concave surface of an adjacent set via a fourth surface, the profile having a repeating pattern of third, second, first and fourth concave surfaces.

15. A method for forming a groove in a surface of a metal part:
    broaching the surface of the metal part to create a groove, the groove having a groove surface;
    carburizing the metal part; and
    broaching a portion of the groove surface with an abrasive-covered broach after carburizing the metal part.

16. The method of claim 15, further comprising:
    after carburizing the metal part, grinding a portion of the surface of the metal part outside the groove, the surface of the metal part outside the groove being the outside surface, the portion of the outside surface having a substantially larger area than the portion of the groove surface.

17. The method of claim 15, further comprising:
    during broaching the portion of the groove surface with the abrasive-covered broach, simultaneously broaching a portion of a surface outside the groove with the abrasive-covered broach.

18. The method of claim 15, further comprising:
    during broaching the portion of the groove surface with the abrasive-covered broach, measuring a force required for broaching; and
    stopping broaching when the force decreases to a predetermined level.

19. The method of claim 15, wherein the abrasive-covered broach is a first abrasive-covered broach having a first grit, and further comprising:
    simultaneously broaching a second portion of the groove surface and a portion of a surface outside the groove with a second abrasive-covered broach, the second grit being different from the first grit.

20. The method of claim 15, the surface of the metal part being an internal surface.

* * * * *

UNITED STATES PATENT AND TRADEMARK OFFICE
CERTIFICATE OF CORRECTION

PATENT NO. : 9,611,535 B2
APPLICATION NO. : 14/471360
DATED : April 4, 2017
INVENTOR(S) : Xavier-Pierre Aitcin et al.

Page 1 of 1

It is certified that error appears in the above-identified patent and that said Letters Patent is hereby corrected as shown below:

In the Specification

Claim 6, Column 11, Line 44, "third abrasive covered" should read -- third abrasive-covered --

Signed and Sealed this
Thirtieth Day of May, 2017

Michelle K. Lee
*Director of the United States Patent and Trademark Office*